United States Patent

[11] 3,614,659

[72] Inventor William W. Rigrod
 Colts Neck, N.J.
[21] Appl. No. 807,242
[22] Filed Mar. 14, 1969
[45] Patented Oct. 19, 1971
[73] Assignee Bell Telephone Laboratories, Incorporated
 Murray Hill, Berkeley Heights, N.J.

[54] SYNCHRONOUS COUPLING OF LASER
 OSCILLATORS TO A COMMON RESONATOR
 8 Claims, 11 Drawing Figs.

[52] U.S. Cl. ................................................ 331/94.5
[51] Int. Cl. ................................................. H01s 3/00
[50] Field of Search ....................................... 331/94.5;
 356/106 RL

[56] References Cited
 UNITED STATES PATENTS
3,382,758 5/1968 Wang ........................... 331/94.5
3,473,031 10/1969 White ........................... 331/94.5
3,479,612 11/1969 Seidel ........................... 331/94.5

Primary Examiner—Ronald L. Wibert
Assistant Examiner—V. P. McGraw
Attorneys—R. J. Guenther and Arthur J. Torsiglieri ABSTRACT: There is disclosed a source of coherent optical energy in which a plurality of lasers pumped to support multiple axial modes are restricted to either mutually phase-locked multiple-mode operation or synchronized single-mode continuous-wave operation by mutual coupling to a common resonator that is adapted to support an additive buildup of intensity from the lasers in a manner providing mutual mode-frequency locking. The common resonator is either a ring or is an interferometric resonator of relatively great free spectral range compared to that of the laser resonators. Mode-frequency selection is facilitated by active media providing strong mode competition and/or by a common resonator having one or more loss ports that contribute to a strong filtering characteristic.

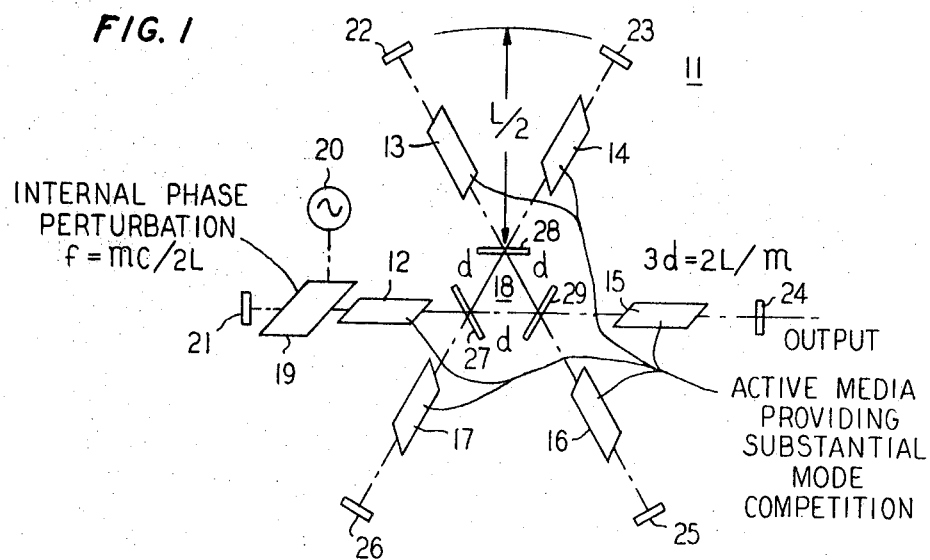
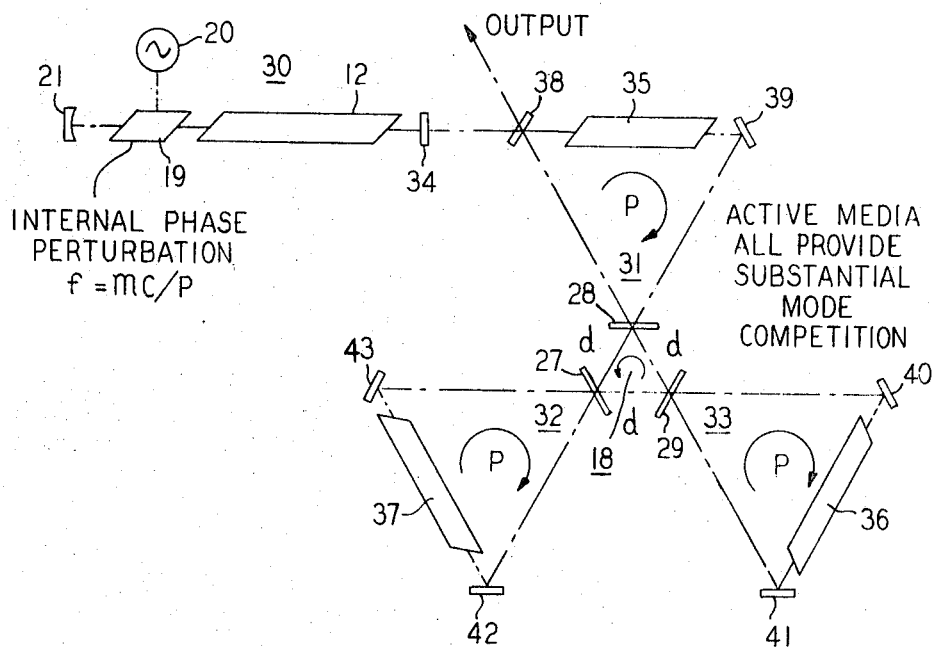
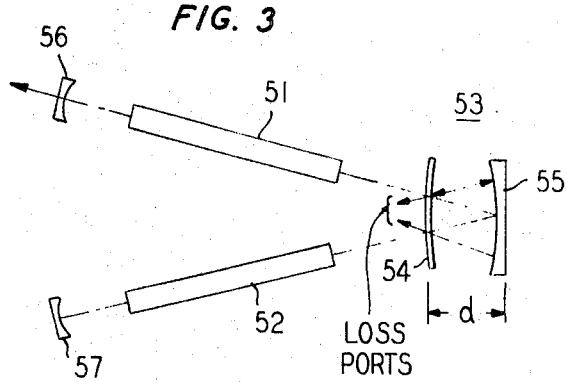

3,614,659

SYNCHRONOUS COUPLING OF LASER OSCILLATORS TO A COMMON RESONATOR

BACKGROUND OF THE INVENTION

This invention relates to mode selection and mode locking in laser resonators.

The term "laser" is an acronym for light amplification by the stimulated emission of radiation. A laser typically includes an active medium that has a pair of energy levels between which the lasing action occurs. The frequency of stimulated radiation corresponding to this pair of levels lies within a band called the line width of the transition, which is partially determined by Doppler broadening. A laser oscillator further includes a resonator formed by a pair of reflecting elements spaced-apart so that at least one frequency lying in the line width can be resonated in the resonator.

In order to obtain oscillations with a generally useful output power level, the length of active material and its gain coefficient typically must be so great that the smallest possible spacing of the reflecting elements still permits oscillations at a plurality of frequencies within the line width. The frequencies correspond to different axial modes of oscillation. Nevertheless, the power output at any one frequency generally can be greatest and most useful when oscillation occurs only at the one frequency. Another very useful form of laser oscillator is one in which the multiple axial modes are caused to have a prescribed phase relationship, called mode locking. A regular train of pulses, useful in optical pulse-code modulation (PCM) communication, is obtained by this technique.

Therefore, it is advantageous to achieve selective control over the oscillator of the axial modes in lasers in such a way as to facilitate the achievement of high-power outputs in desired forms.

Many different techniques have been proposed for axial mode selection and for mode locking.

One technique for axial mode selection at higher power levels involves the employment of a three-legged or split-beam resonator, such as that disclosed by M. DiDomenico et al. in their U.S. Pat. No. 3,414,840, issued Dec. 3, 1968, and assigned to the assignee hereof. In that resonator, two sections of the active medium appear in different resonant portions of the resonator, those portions having coincident resonant frequencies that are separated by more than the oscillation bandwidth of each resonator portion in combination with its section of active medium. Since the two resonant portions of the resonator are coupled in parallel with respect to the beamsplitting surface, in the sense that there is at least a partial overlap of the two portions, the maintenance of identical beam diameter and wave-front curvature in the common leg, or overlap region, of the interferometer is critical to the desired interference effects. To maintain coincidence in their resonant frequencies, moreover, the lengths of the two resonant portions must be fixedly stably with respect to each other. Accordingly, the three-legged resonator is somewhat difficult to fabricate, to adjust, and to be kept stable.

While other techniques are known for coupling several laser oscillators to provide increased power output, most of these techniques do not provide a sufficiently strong filtering action to compel single frequency oscillation or do not provide sufficiently strong control of oscillating modes to yield mode-locked oscillation.

SUMMARY OF THE INVENTION

According to my invention, a plurality of lasers are pumped to support multiple axial modes and are restricted either to mutually phase-locked multiple-mode operation or synchronized single-mode operation by mutual coupling to a common resonator that supports a buildup of light intensity under conditions providing mode-frequency locking. In the single mode case, the locking occurs among the single modes of the different lasers.

In one group of embodiments, mode-competition characteristics of the active medium are selected to contribute the conditions providing mode-frequency locking. In a second group of embodiments, the common resonator has one or more loss ports contributing a strong filtering characteristic that provides mode-frequency locking.

In either group of embodiments, single-mode operation is typically produced by interferometric mode selection. In either group of embodiments, phase-locked multiple-mode operation can be produced by suitable modulation in one branch at the mode spacing frequency or an integral multiple thereof. Nevertheless, such modulation is unnecessary in some of the embodiments.

More complex configurations may also employ the principles of the invention. For example, two or more active ring lasers can be coupled to a common resonator according to the present invention.

BRIEF DESCRIPTION OF THE DRAWING

Other features and advantages of the present invention will become apparent from the following detailed description, in conjunction with the drawing, in which:

FIG. 1 is a partially pictorial and partially block diagrammatic illustration of an illustrative embodiment of the invention;

FIG. 2 shows a modification of the embodiment of FIG. 1 employing a plurality of ring lasers;

FIG. 3 is a partially pictorial and partially block diagrammatic illustration of another embodiment of the invention in which strong filtering via interferometer loss ports is applied to two compactly coupled broad band lasers;

Although the principles of my invention are applicable to either mutually phase-locked multiple-mode lasers or to synchronized single-mode lasers, the former will be described first because of its utility in producing a train of high-power pulses, such as would be useful in an optical pulse-code-modulation (PCM) communication system.

The basic known principles of a single phase-locked multiple-mode laser also apply to a plurality of mutually phased-locked multiple-mode lasers. These principles are as follows.

Figure 10:
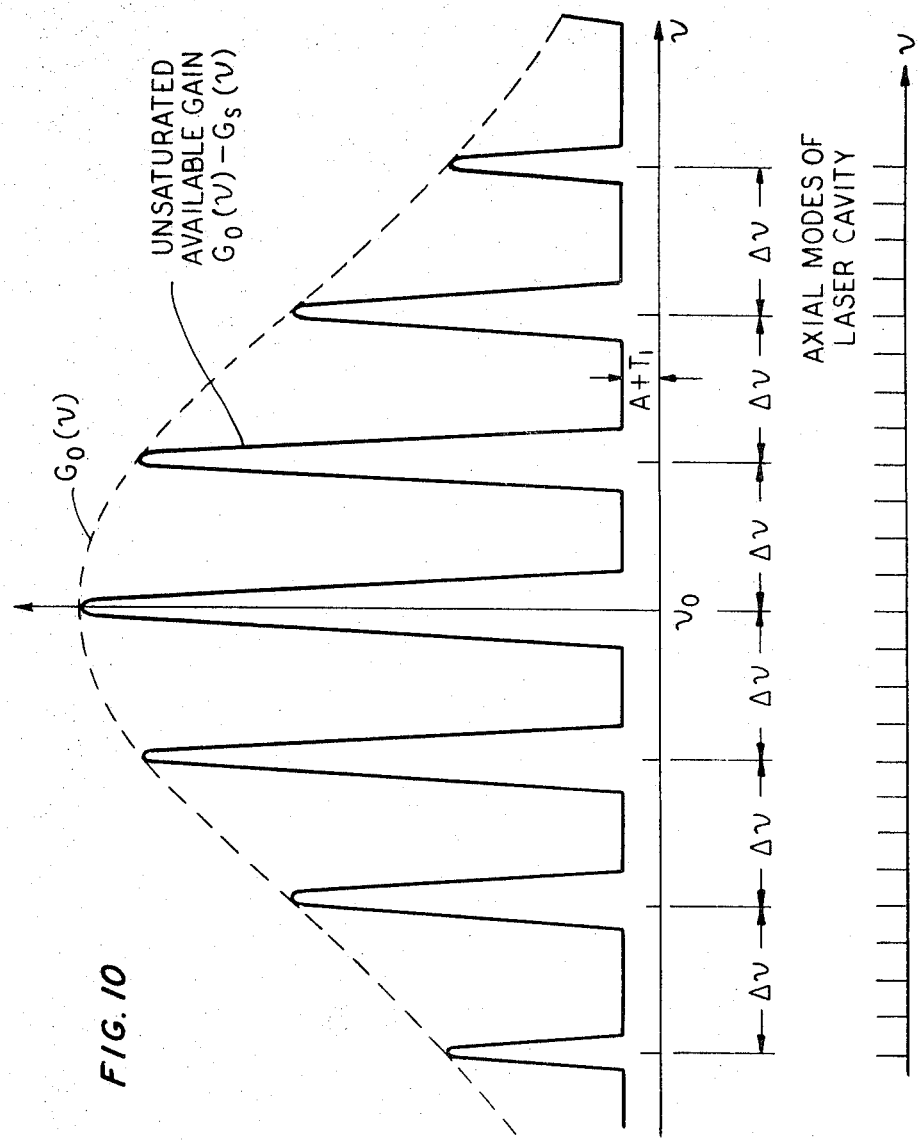
FIG. 10 shows curves which are helpful in explaining the invention.

The spectrum of a free-running multimode laser, oscillating in a single transverse mode, is unstable in amplitude and frequency. Internal modulation of the cavity by a time-varying loss or phase perturbation, at a frequency slightly greater than the $c/2L$ mode spacing, or its $m$th harmonic $mc/2L$, can phase-lock the axial modes to form a stable spectrum of oscillations at equidistant frequencies, spaced at the perturbation frequency. The line widths of these different modes are shown in FIG. 10, in which the perturbation frequency is designated $\Delta\nu$. When N oscillating modes are in phase, their fields add up to produce an output train of pulses whose intensities are about N times the total multimode power, with a period of $2L/mc$. and a pulse duration of about $(\Delta\nu_{osc})^{11}$, where $\Delta\nu_{osc}$ is the oscillation bandwidth, and illustratively is the width of the dotted curve at the level $A+T_1$, where A is the fractional internal loss and $T_1$ is fractional output transmittance.

Self-locking of axial modes spaced at various harmonics of the $c/2L$ spacing has been observed within a limited excitation range, depending on the laser medium, cavity length, location of the laser element within the cavity, and whether the oscillations are unidirectional (as in a ring laser) or bidirectional. The main features of self-locking can be understood either in terms of mode interaction in a nonlinear medium, or in terms of the transient response of that medium to a periodic train of narrow pulses.

A laser which self-locks at low-excitation levels may fail to do so at higher levels because of instability caused by gain competition among a greater number of modes than before and greater distortion of the laser gain profile than before. These effects impede self-locking. I have found that these problems are accentuated in attempting to mutually phase-lock a plurality of multiple-mode lasers. Correspondingly the enhancement of a reduced number of selected modes produced by the suppression of unwanted axial modes with a periodic mode selector serves to reduce the instability of the selected modes and improve their coupling, thereby assisting in self-locking of the selected modes.

In the coupled system for phase-locked laser oscillators shown in FIG. 1, one oscillator including the active medium 12 is phase-locked by the known technique of internal phase perturbation, as provided by the electro-optic phase modulator 19 and source 20 of a signal at the mode-spacing frequency or integral multiple thereof. The mode-spacing frequency is of the smallest frequency difference between the frequencies of different axial modes, all of which are approximately equally spaced in frequency. Reflector 21 is one end reflector of this first oscillator; and the ring resonator 18 is effectively the other end reflector of this oscillator. The phase-locked output of this first oscillator is injected into the other oscillators including the active media 13–16 via ring resonator 18, which also effectively forms one end reflector for each of the other laser oscillators. These other oscillators include active media 13–17 and respective individual end reflectors 22–26. Each of the oscillators is pumped to support multiple modes.

When the injected mode intensities are sufficiently high, and the individual lasers turned to approximately the same mode spacing, the injected radiation from medium 12 can frequency-lock the corresponding modes in all the media, and quench those modes which are absent in the injected signal.

To facilitate such operation, the pathlength 3d of the ring resonator is an integral submultiple, for which m is the corresponding integer, of four times the pathlength between each individual end reflector and ring resonator 18. This relationship makes the axial mode spacing of resonator 18 equal to a submultiple of the above-mentioned frequency difference between the locked modes and ensures simultaneous resonance of all the resonators. Since the ring resonator 18 is thus not necessarily interferometric, in the sense of not having loss discrimination to help suppress the axial modes not present in the injected signal, it is also provided that the active media 12–17 provide substantial competition among the multiple modes. To this end the media 12–17 are, for example, argon ion laser media pumped with an electrical discharge and having gas return paths of known type outside the discharge region.

The free spectral range of the compound resonator is the frequency difference between neighboring resonant axial modes of the smaller, or auxiliary, resonator which couples together the selected modes of the active resonators.

The distinctive feature of the embodiment of FIG. 1 is the provision of synchronous mode selection among the different lasers of the array by means of the passive ring resonator 18 and the injected signal.

In operation, pulses injected into the coupling return to their origins in step with later pulses; and all of the lasers feed pulses into the ring synchronously. Portions of the pulses from each laser are resonantly coupled by the common resonator into all the other lasers, promoting mode competition. Note that internal phase perturbation is needed only in one laser.

The appropriate portion of the combined laser power can be transmitted through the end reflector 24 as an output. Enough power is retained in the system to sustain oscillations. It is, of course, apparent that the total output power increases in direct relationship to the number of active media that are mutually phase-locked.

The apparatus of FIG. 1 can be characterized as an array of linear bidirectional phase-locked lasers with passive coupling ring.

In the modification shown in FIG. 2, the principle difference from the embodiment of FIG. 1 resides in the fact that all the lasers but the internally phase-modulated lasers 30 are unidirectional ring lasers 31, 32 and 33. They are rendered unidirectional by injection of light in the preferred direction, through the output coupling mirror 38.

In operation, the mode-competition and phase-locking contribution by the laser media to mutual phase-locking is similar to that of FIG. 1, but is twice as strong because each mode gathers power from a group of excited atoms covering a broader range of atom velocities.

Other laser active media which are attractive for use in the embodiments of FIGS. 1 and 2 include carbon dioxide lasing at 10.6 microns, other ion lasers and other molecular lasers. In the molecular lasers, the differing lines of oscillation fulfill the role of multiple axial modes and are phase-locked, even though there may be only one axial mode within each oscillating line.

As pointed out above, mutually phase-locked multiple-mode embodiments such as those of FIGS. 1 and 2 are readily converted to synchronized single-mode (single frequency) operation by substituting interferometric mode selection for the internal phase perturbation. Such a modification of the embodiment of FIG. 2 is shown in FIG. 9 in elemental form and discussed hereinafter.

In the embodiments of FIGS. 3–8, there are shown arrays of lasers having resonators providing interferometric selection by the common resonator of a single synchronized oscillating mode the entire array. It is desired to obtain high power output at a single oscillating frequency from relatively broadband lasers, such as solid-state lasers. While the embodiments shown are single-frequency arrays of lasers, the arrays shown are readily modified to provide phase-locked multiple-mode operation. This result is achieved by decreasing the free spectral range of the common interferometric resonator to select a multiplicity of equidistant oscillation frequencies, rather than a single frequency. In either case, the individual active media are pumped sufficiently hard that they would support a plurality of axial modes in a simple linear or ring resonator.

Figure 9:
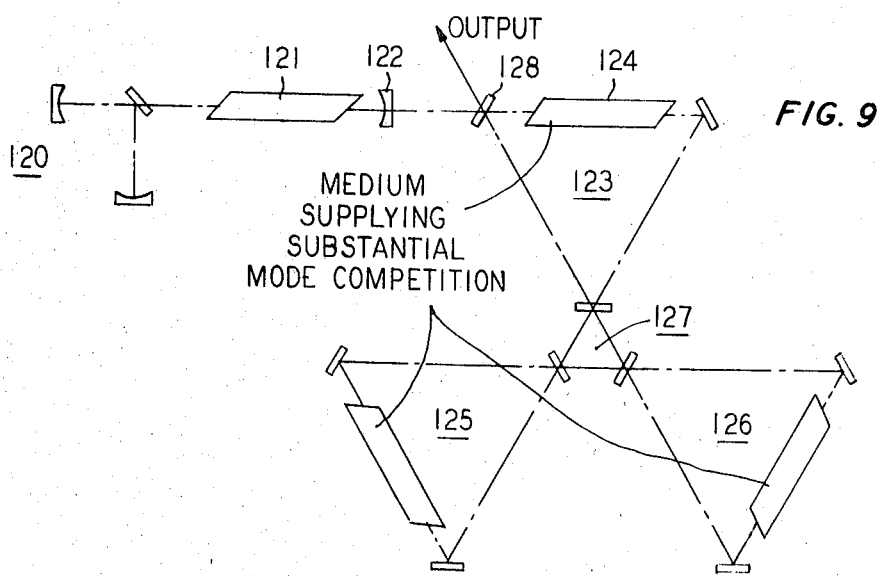
FIG. 9 shows a modification of the embodiments of FIGS. 1 and 2 illustrating the general principles of conversion between phase-locked multiple-mode operation and single-mode operation.

The embodiments of FIGS. 3–7 differ from the embodiments of FIGS. 1, 2 and 9 in that they employ a common mode-selecting resonator which has an interferometric loss port for each of the coupled lasers.

In the embodiment of FIG. 3, active media 51 and 52, illustratively ruby laser rods with antireflection-coated end surfaces are coupled to the common confocal mode-selecting resonator 53 including just two reflectors 54 and 55. Reflector 54 serves as the coupling element between common resonator 53 and the individual laser resonators formed about active media 51 and 52. Those individual resonators include respective individual end reflectors 56 and 57 and are closed by common resonator 53, which acts as the other end reflector of the resonator for each individual laser.

One of the advantages of the interferometric arrangement of FIG. 3 is that each beam spot on reflectors 54 and 55 is imaged back itself (not inverted) after each multiple-path traversal of resonator 53, thereby making mode-matching of the laser beam to the resonator 53 relatively uncritical.

Figure 4:
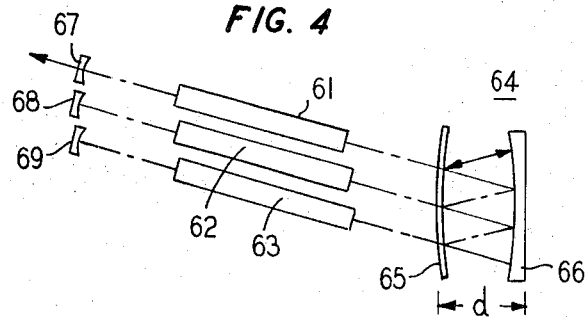
FIG. 4 shows a modification of the embodiment of FIG. 3 for a compact array of three lasers.
Figure 7:
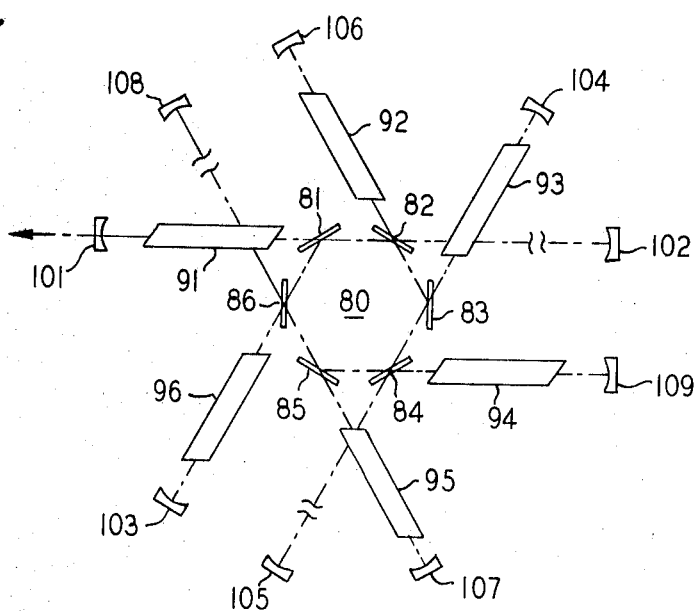
Figure 8:
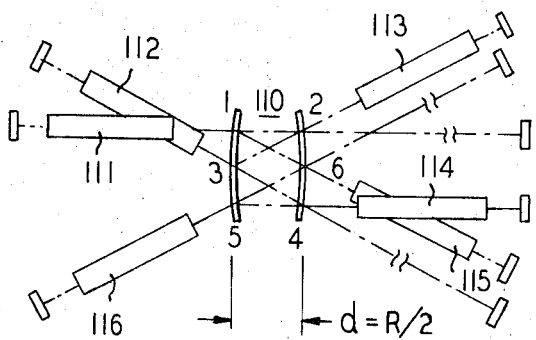

In its symmetrical form shown in FIG. 3, the common interferometric confocal resonator 53 forms an off-axis spherical-mirror interferometer of type now well known in the optical arts. An injected light beam is imaged back on itself after $v$ round trips when $$g_1 g_2 = \cos^2(m\pi/v) \quad (1)$$

where $g_1$ $g_2$ is a stability parameter that illustratively has the value one-half here, and $m$ is an integer which is the number of complete circuits about the optical axis of the device which the multiple-segment optical path makes in order to close upon itself. In FIGS. 3 and 4, $v$ must be an even number and the ray paths are bidirectional. In FIGS. 6, 7 and 8, however, $v$ may be either even or odd. A round trip is a path from a given reflector back to any other point on that same reflector.

In the operation of the embodiment of FIG. 3 to obtain a single-frequency output, the filtering effect for axial modes not simultaneously resonant in all three resonators is quite strong, because the modes not simultaneously resonant are predominantly ejected from the apparatus at the indicated loss ports, without building up in energy.

The loss ports are areas of partial beam transmission at reflector 54 out of common resonator 53 in directions which do not intercept an active medium or media or any further reflector which could return light.

Note that the axial mode selectively of the symmetrical arrangement of FIG. 3 can be great enough that mode-competition characteristics in the active media are less important than in the embodiments of FIGS. 1 and 2. The mode-selectivity derives not only from the loss ports but also from the large free spectral range of resonator 53 and the fact that the active media are coupled without multiplying the lengths of their principal resonators.

In FIGS. 3–8, the active media illustratively are arranged on hyperboloids of revolution for compactness and ease of mechanical stabilization.

FIG. 4 shows a modification of the embodiment of FIG. 3 in which the active media 61, 62 and 63 are compactly arranged symmetrically with respect to one another by appropriate choice of the coupling and loss ports of common resonator 64. This virtual confocal embodiment, which is asymmetric about a plane midway between the mirrors of the coupling cavity, can obviously be expanded to include a very large number of the active media.

Figure 5:
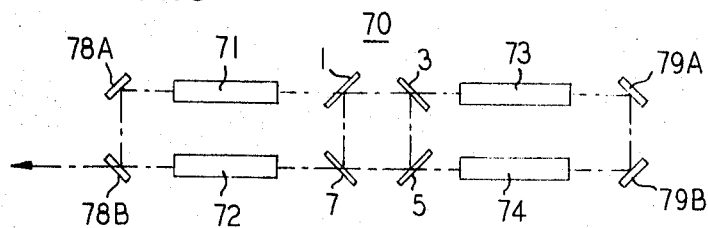
FIGS. 5, 6A, 6B, 7 and 8 show still other modifications of the embodiment of FIG. 3 in which a multiplicity of lasers are compactly coupled by means of an interferometric ring resonator.

FIG. 5 shows a further modification of the embodiment of FIG. 3 in which two ring lasers are coupled to a common interferometric cavity 70 of the ring-resonator type. Since each ring laser is coupled to the mode selector cavity 70 by means of two loss ports, this embodiment provides the same mode selectively as in the embodiments of FIGS. 3 and 4 with twice the gain in each laser, or alternatively twice as much mode selectively for the same gain.

This embodiment is stagger tuned by providing that the laser resonator including reflectors 78A, 78B and common resonator 70 has a slightly different pathlength than the laser resonator including reflectors 79A, 79B and common resonator 70. The pathlength difference is a small fraction of the pathlength of the common resonator 70, so that the common resonances of all three cavities are separated by many times the free spectral range of resonator 70. This mode of construction is generally useful for obtaining single frequency oscillations from very wideband lasers.

Figure 6A:
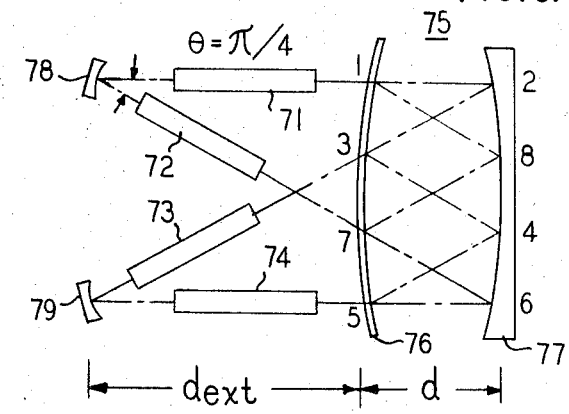
Figure 6B:
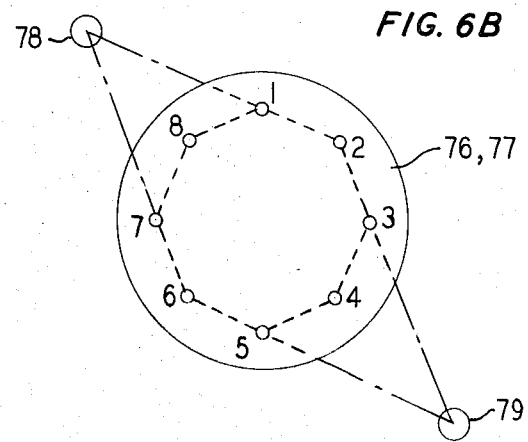

In FIGS. 6A and 6B there are shown two views of a ring-type interferometric mode-selecting resonator in an apparatus including a plurality of active media 71, 72, 73, 74, which is equivalent to the structure of FIG. 5 but is easier to align and adjust. The four beam splitters of FIG. 5 are now replaced by four spots on one beam splitter 76. This embodiment differs from the injection-locked embodiments illustrated by FIG. 2, also employing individual ring-type lasers, in that, in the absence of strong mode competition, strong loss discrimination against unwanted modes and tighter synchronization is provided by a strongly interferometric mode-selecting relationship among the various resonators of the compound resonator; that is, by providing adequate loss ports.

The embodiment of FIGS. 6A and 6B includes a plurality of ring lasers coupled to a symmetrical reentrant common resonator 75, with one partially transmissive reflector 76 and an opposing totally reflecting back reflector 77 which images each light beam back on itself, as is appropriate for an off-axis spherical-reflector interferometer. Individual reflectors 78 and 79 close the resonators of the individual lasers. FIG. 6A is schematic only and is not germetrically accurate in that reflectors 78 and 79 are actually more widely spaced from each other as indicated in FIG. 6B. The rays are drawn schematically in the plane of the drawing; but for greater system compactness, the off-axis laser beams can be injected at an azimuthal angle $\theta = \pi/\nu$ to fall on both mirrors 76 and 77 at spots in circles around the optical axis of the common resonator 75. This arrangement places the active media on a hyperboloid of revolution. Such a spacing of the spots is shown schematically in the partial end view of the apparatus shown in FIG. 6B. For this purpose, one can imagine that reflectors 76 and 77 are projected onto a common plane, the plane of the paper.

To obtain single-frequency synchronized oscillations from the plurality of lasers in FIG. 6A, the overall frequency spacing between the axial modes simultaneously resonant in all of the resonators is chosen equal to or slightly greater than the oscillation bandwidths of an individual laser of the type combined in FIG. 6. This frequency spacing is determined primarily by the free spectral range of common resonator 75, when the laser resonators are identical in length. Otherwise, stagger-tuning can make the spacing large enough to achieve a single frequency. Also the loss discrimination against the nearby modes, which are resonant only in the longer resonators of the compound arrangement, is increased by the loss ports at spots 1, 3, 5 and 7. That is, since power is circulating illustratively in both directions in the compound ring, in the absence of strong mode competition, some power will escape upward and to the left at spots 1 and 3 and downward and to the left at spots 5 and 7. Such strong loss discrimination is desirable, for example, when the laser active media 71 through 74 are ruby laser rods or neodymium ion laser rods having yttrium aluminum garnet host crystals.

In the embodiments of FIG. 7 and FIG. 8 the interferometric mode selection principles of the embodiments of FIGS. 4, 5, 6A and 6B are extended to include more complex symmetrical arrays of laser resonators coupled to a common resonator. Illustratively in both of these embodiments mode selectivity is increased by pathlength differences between the individual laser resonators which are coupled to the common ring. The pathlength differences are chosen to maintain overall symmetry in the array.

In the embodiment of FIG. 7 the common ring resonator is formed by reflectors 81, 82, 83, 84, 85 and 86 and each of the laser elements 91, 92, 93, 94, 95 and 96 is included in at least one three-mirror resonator, with all of the three-mirror resonators interleaved with each other about the equilateral ring resonator 80. For example, one of the three-mirror resonators for the active medium 96 includes mirror 103, partially transmissive reflector 86 and reflectors 107 and 108. A three-mirror resonator for active medium 92 includes reflector 106, partially transmissive reflector 82 and reflectors 101 and 102. Three of the active media 91, 93 and 95 have a straight primary resonator which is a two-reflector in-line resonator coupled to a loss port by one of the partially transmissive reflectors of ring resonator 80. These latter media are alternated with the media in folded resonators to form interleaved three-reflector interferometric lasers.

A more compact embodiment of the structure of FIG. 7 employing an off-axis spherical interferometer 110 is shown in FIG. 8. The active media 111 through 116 are similar to those of FIG. 7.

Operation similar to that of FIG. 7 is provided in FIG. 8 with substantially fewer reflectors by using the off-axis spherical interferometer 110. In order to maintain symmetry in the embodiments of FIGS. 7 and 8, pathlengths of a first group of symmetrically disposed individual resonators have a first value; and the pathlengths of a second group of symmetrically disposed individual resonators have a second value different from the first value.

Not shown, but readily visualized, are coupled ring lasers of the type shown in FIGS. 6A and 6B in which the common resonator pathlength is nearly as large as that of an individual ring resonator therein, with a sufficiently large reflector spacing $d$ such that laser rods or other sections of active medium can be disposed inside of the common resonator along the segments of the folded path therein. Interferometric mode selection can still be provided by appropriate differences in pathlength.

The embodiments of FIGS. 3 through 8 can be adapted for mutually phase-locked, multiple-mode operation be deliberately decreasing the frequency spacing of the selected modes; for example, by increasing the pathlength of the common resonator and making it a submultiple which is a larger fraction of the pathlength possessed by all of the individual resonators to a degree which accentuates whatever mode competition characteristics are naturally possessed by the active media by intensifying the selected modes at the expense of those suppressed.

Typical, the free spectral range of the common resonator 53 is approximately equal to the average hole width to be expected in the saturated gain profile of each laser. The hole width is approximately the average of the widths of the modes as shown at the level $A + T_1$ in FIG. 10.

As mentioned above, lasers in which the active media provide substantial mode competition are readily converted from mutually phase-locked multiple-mode operation of the type shown in FIG. 2 to synchronized single-mode operation by the relatively simple modification shown in FIG. 9. Here the three-legged mode selector resonator 120 is disposed in the one external branch of the compound resonator in order to compel single-frequency operation in the laser including the active medium 121 and the end mirror 122 opposite the compound reflector 120. This single-frequency oscillation is then injected into the ring resonator 123 in which the active medium 124 is disposed. Mode competition in the medium 124 will quench all modes therein except the injected mode. Similarly, ring resonators 125 and 126 are coupled with the ring resonator 123 via the common ring resonator 127 in which the combined power of all the laser active media circulates. An appropriate portion of the combined power may be extracted at the reflector 128 through which the single-frequency power is injected. Still larger numbers of active media may be synchronously coupled in similar fashion.

Single-frequency embodiments of the interferometrically coupled structures of FIGS. 3, 4 and 6–8 can be adapted for use with wideband solid state or liquid lasers by means of appropriate pathlength differences between the individual coupled resonators, since all of the latter must be simultaneously resonant at a selected frequency. This interferometric tuning technique may, in both symmetrical and nonsymmetrical embodiments, be termed staggered tuning, such as employed in FIG. 5.

I claim:

1. Apparatus comprising a plurality of lasers having a plurality of active media and having pumping means and resonator means for supporting oscillations in a plurality of axial modes, and means coupled with said lasers for modifying the oscillations of said lasers, comprising a common optical resonator resonantly coupled to said lasers and tuned to support therein an additive buildup of intensity from said lasers in a manner providing mutual mode-frequency locking among said lasers.

2. Apparatus according to claim 1 in which the common optical resonator is a ring resonator coupled to the plurality of lasers.

3. Apparatus according to claim 1 in which the common optical resonator is a reentrant off-axis spherical-reflector interferometer coupled to the plurality of lasers.

4. Apparatus according to claim 1 in which the common optical resonator is coupled to the lasers in a manner providing mutual mode-frequency locking in that a plurality of the active media are media providing substantial mode competition, said common resonator resonantly coupling energy from each of said media into all of said active media providing substantial mode competition.

5. Apparatus according to claim 1 in which the common optical resonator is coupled to the plurality of lasers in a manner providing mutual mode-frequency locking among said lasers in that said common resonator has a free spectral range that is substantially larger than individual axial mode spacings of said lasers and is coupled to free space via a plurality of loss ports to suppress a plurality of the axial modes resonant in said lasers.

6. Apparatus according to claim 5 in which the lasers and the common resonator are mutually tuned to provide a single frequency of the mutual mode-frequency locking among said lasers.

7. Apparatus according to claim 6 in which the lasers and the common resonator in combination produce mutual competition among differing axial modes selected to provide a plurality of frequencies of the mutual mode-frequency locking among said lasers, said common resonator having a free spectral range approximately equal to the average hole width to be expected in the saturated gain versus frequency profile of each of said lasers.

8. Apparatus according to claim 5 in which the plurality of coupled lasers are stagger-tuned to increase the frequency spacing between the axial modes simultaneously resonant in said lasers and said common resonator to a degree providing single-frequency oscillation.

UNITED STATES PATENT OFFICE
CERTIFICATE OF CORRECTION

Patent No. 3,614,659                                   Dated October 19, 1971

Inventor(s)  William W. Rigrod

It is certified that error appears in the above-identified patent and that said Letters Patent are hereby corrected as shown below:

Column 1, line 25, change "the" to --that--; line 54, change "fixedly" to --fixed--. Column 2, line 66, change ")$^{11}$" to --)$^{-1}$--. Column 3, line 16, change "for" to --of--; line 35, change "turned" to --tuned--; line 64, after "coupling" insert --ring--. Column 4, line 33, after "mode" insert --for--; line 61, after "back" insert --on--. Column 5, line 14, change "selectively" to --selectivity--; line 17, change "selectively" to --selectivity--; line 38, change "selectively" to --selectivity--; line 40, change "selectively" to --selectivity--  Column 7, line 4, change "be" to --by--; line 13, change "typical" to --typically--.

Signed and sealed this 27th day of June 1972.

(SEAL)
Attest:

EDWARD M. FLETCHER, JR.               ROBERT GOTTSCHALK
Attesting Officer                     Commissioner of Patents